US010152212B2

(12) United States Patent
Tripoli et al.

(10) Patent No.: US 10,152,212 B2
(45) Date of Patent: Dec. 11, 2018

(54) MEDIA CONTAINER ADDITION AND PLAYBACK WITHIN QUEUE

(71) Applicant: Sonos, Inc., Santa Barbara, CA (US)

(72) Inventors: Ben Tripoli, Santa Barbara, CA (US); Robert Lambourne, Santa Barbara, CA (US); Yasser Rashid, Santa Barbara, CA (US); Joni Hoadley, Santa Barbara, CA (US)

(73) Assignee: Sonos, Inc., Santa Barbara, CA (US)

( * ) Notice: Subject to any disclaimer, the term of this patent is extended or adjusted under 35 U.S.C. 154(b) by 243 days.

(21) Appl. No.: 14/683,467

(22) Filed: Apr. 10, 2015

(65) Prior Publication Data

US 2016/0299665 A1    Oct. 13, 2016

(51) Int. Cl.
*G06F 3/0484* (2013.01)
*G06F 17/30* (2006.01)

(52) U.S. Cl.
CPC .... *G06F 3/04842* (2013.01); *G06F 17/30053* (2013.01); *G06F 17/30772* (2013.01)

(58) Field of Classification Search
CPC .................................................. G06F 3/04842
See application file for complete search history.

(56) References Cited

U.S. PATENT DOCUMENTS

| | | |
|---|---|---|
| 5,440,644 A | 8/1995 | Farinelli et al. |
| 5,761,320 A | 6/1998 | Farinelli et al. |
| 5,923,902 A | 7/1999 | Inagaki |
| 5,974,299 A | 10/1999 | Massetti |
| 6,032,202 A | 2/2000 | Lea et al. |
| 6,199,076 B1 | 3/2001 | Logan et al. |
| 6,255,961 B1 | 7/2001 | Van Ryzin et al. |
| 6,256,554 B1 | 7/2001 | Dilorenzo |

(Continued)

FOREIGN PATENT DOCUMENTS

| | | |
|---|---|---|
| EP | 1389853 A1 | 2/2004 |
| WO | 200153994 | 7/2001 |
| WO | 2003093950 A2 | 11/2003 |

OTHER PUBLICATIONS

Advisory Action dated May 4, 2016, issued in connection with U.S. Appl. No. 13/848,585, filed Mar. 21, 2013, 5 pages.

(Continued)

*Primary Examiner* — Roland J Casillas
(74) *Attorney, Agent, or Firm* — McDonnell Boehnen Hulbert & Berghoff LLP

(57) ABSTRACT

An example implementation may involve a control device displaying a control interface that includes an indication of one or more playable media items. The example implementation may further involve detecting input data indicating a selection of a particular instance of the given media item from among the one or more playable media items. Upon detecting the input data, the control device may identify a container of two or more media items, the container including the particular instance of the given media item and indicating a sequence for the two or more media items. The example implementation may also involve inserting the two or more media items of the identified container into a queue such that the two or more media items follow the indicated sequence within the queue, and causing one or more playback devices to initiate playback of the queue beginning with the given media item.

20 Claims, 7 Drawing Sheets

(56) References Cited

U.S. PATENT DOCUMENTS

| | | |
|---|---|---|
| 6,404,811 B1 | 6/2002 | Cvetko et al. |
| 6,469,633 B1 | 10/2002 | Wachter |
| 6,522,886 B1 | 2/2003 | Youngs et al. |
| 6,611,537 B1 | 8/2003 | Edens et al. |
| 6,631,410 B1 | 10/2003 | Kowalski et al. |
| 6,678,215 B1 | 1/2004 | Treyz et al. |
| 6,757,517 B2 | 6/2004 | Chang |
| 6,778,869 B2 | 8/2004 | Champion |
| 6,953,886 B1 | 10/2005 | Looney et al. |
| 7,020,048 B2 | 3/2006 | McComas |
| 7,130,608 B2 | 10/2006 | Hollstrom et al. |
| 7,130,616 B2 | 10/2006 | Janik |
| 7,136,934 B2 | 11/2006 | Carter et al. |
| 7,143,939 B2 | 12/2006 | Henzerling |
| 7,236,773 B2 | 6/2007 | Thomas |
| 7,281,034 B1 | 10/2007 | Eyal |
| 7,295,548 B2 | 11/2007 | Blank et al. |
| 7,391,791 B2 | 6/2008 | Balassanian et al. |
| 7,469,283 B2 | 12/2008 | Eyal et al. |
| 7,483,538 B2 | 1/2009 | McCarty et al. |
| 7,571,014 B1 | 8/2009 | Lambourne et al. |
| 7,630,501 B2 | 12/2009 | Blank et al. |
| 7,643,894 B2 | 1/2010 | Braithwaite et al. |
| 7,657,910 B1 | 2/2010 | McAulay et al. |
| 7,668,936 B1 | 2/2010 | Krikorian et al. |
| 7,797,446 B2 | 9/2010 | Heller et al. |
| 7,827,259 B2 | 11/2010 | Heller et al. |
| 7,853,341 B2 | 12/2010 | McCarty et al. |
| 7,958,441 B2 | 6/2011 | Heller et al. |
| 7,987,294 B2 | 7/2011 | Bryce et al. |
| 8,014,423 B2 | 9/2011 | Thaler et al. |
| 8,045,952 B2 | 10/2011 | Qureshey et al. |
| 8,103,009 B2 | 1/2012 | McCarty et al. |
| 8,131,389 B1 | 3/2012 | Hardwick et al. |
| 8,234,395 B2 | 7/2012 | Millington et al. |
| 8,483,853 B1 | 7/2013 | Lambourne |
| 8,818,538 B2 | 8/2014 | Sakata |
| 8,942,252 B2 | 1/2015 | Balassanian et al. |
| 8,996,145 B2 | 3/2015 | Malcolm et al. |
| 2001/0030667 A1 | 10/2001 | Kelts |
| 2001/0042107 A1 | 11/2001 | Palm |
| 2002/0002039 A1 | 1/2002 | Qureshey et al. |
| 2002/0022453 A1 | 2/2002 | Balog et al. |
| 2002/0026442 A1 | 2/2002 | Lipscomb et al. |
| 2002/0068558 A1 | 6/2002 | Janik |
| 2002/0069412 A1 | 6/2002 | Philips |
| 2002/0098813 A1 | 7/2002 | Likourezos et al. |
| 2002/0112237 A1 | 8/2002 | Kelts |
| 2002/0113824 A1 | 8/2002 | Myers |
| 2002/0124097 A1 | 9/2002 | Isely et al. |
| 2002/0147728 A1 | 10/2002 | Goodman et al. |
| 2002/0152278 A1 | 10/2002 | Pontenzone et al. |
| 2003/0028505 A1 | 2/2003 | O'Rourke et al. |
| 2003/0157951 A1 | 8/2003 | Hasty |
| 2004/0024478 A1 | 2/2004 | Hans et al. |
| 2004/0025184 A1 | 2/2004 | Hakenberg et al. |
| 2004/0025185 A1 | 2/2004 | Goci et al. |
| 2004/0078383 A1 | 4/2004 | Mercer et al. |
| 2004/0078812 A1 | 4/2004 | Calvert |
| 2004/0141476 A1 | 7/2004 | Chumbley et al. |
| 2004/0158555 A1 | 8/2004 | Seedman et al. |
| 2004/0202059 A1 | 10/2004 | McComas |
| 2004/0260682 A1 | 12/2004 | Herley et al. |
| 2004/0261040 A1 | 12/2004 | Radcliffe et al. |
| 2005/0138193 A1 | 6/2005 | Encarnacion et al. |
| 2006/0095331 A1 | 5/2006 | O'Malley et al. |
| 2006/0168340 A1 | 7/2006 | Heller et al. |
| 2006/0195521 A1* | 8/2006 | New .................. G06F 17/30766 709/204 |
| 2007/0142944 A1 | 6/2007 | Goldberg et al. |
| 2007/0244856 A1* | 10/2007 | Plastina ............ G06F 17/30053 |
| 2012/0311443 A1* | 12/2012 | Chaudhri ............. G11B 27/105 715/716 |
| 2013/0007617 A1* | 1/2013 | Mackenzie ....... G06F 17/30017 715/716 |
| 2014/0075308 A1* | 3/2014 | Sanders ............ G06F 17/30772 715/716 |

OTHER PUBLICATIONS

Advisory Action dated Nov. 5, 2012, in connection with U.S. Appl. No. 11/126,871, filed May 11, 2005, 3 pages.
Advisory Action dated Feb. 10, 2016, issued in connection with U.S. Appl. No. 13/798,977, filed Mar. 13, 2013, 3 pages.
Advisory Action dated Jul. 12, 2013, issued in connection with U.S. Appl. No. 11/126,871, filed May 11, 2005, 3 pages.
Advisory Action dated Aug. 22, 2014, issued in connection with U.S. Appl. No. 11/126,871, filed May 11, 2005, 4 pages.
Final Office Action dated Jun. 12, 2014, issued in connection with U.S. Appl. No. 11/126,871, filed May 11, 2005, 15 pages.
Final Office Action dated Jul. 8, 2015, issued in connection with U.S. Appl. No. 11/126,871, filed May 11, 2005, 17 pages.
Final Office Action dated Feb. 11, 2016, issued in connection with U.S. Appl. No. 13/848,585, filed Mar. 21, 2013, 12 pages.
Final Office Action dated Jun. 15, 2016, issued in connection with U.S. Appl. No. 11/126,871, filed May 11, 2005, 18 pages.
Final Office Action dated Sep. 15, 2009, issued in connection with U.S. Appl. No. 11/126,871, filed May 11, 2005, 20 pages.
Final Office Action dated Oct. 21, 2015, issued in connection with U.S. Appl. No. 13/798,977, filed Mar. 13, 2013, 28 pages.
Final Office Action dated May 24, 2013, issued in connection with U.S. Appl. No. 11/126,871, filed May 11, 2005, 24 pages.
Final Office Action dated Nov. 26, 2008, issued in connection with U.S. Appl. No. 11/126,871, filed May 11, 2005, 20 pages.
Final Office Action dated Aug. 27, 2012, issued in connection with U.S. Appl. No. 11/126,871, filed May 11, 2005, 12 pages.
Krishnan et al., "Customized internet radio," Computer Networks 33.1, 2000, pp. 609-618.
"MusicMatch First Jukebox Software to Integrate Internet Radio Tuner, Offering the Most Powerful Music Playback and Streaming Capabilities Available," The Free Library, 2000 PR Newswire Association LLC, 3 pages.
Non Final Office Action dated Feb. 3, 2010, issued in connection with U.S. Appl. No. 11/126,871, filed May 11, 2005, 20 pages.
Non-Final Office Action dated May 1, 2008, issued in connection with U.S. Appl. No. 11/126,871, filed May 11, 2005, 15 pages.
Non-Final Office Action dated May 5, 2015, issued in connection with U.S. Appl. No. 13/798,977, filed Mar. 13, 2013, 53 pages.
Non-Final Office Action dated Feb. 6, 2012, issued in connection with U.S. Appl. No. 11/126,871, filed May 11, 2005, 18 pages.
Non-Final Office Action dated Dec. 9, 2013, issued in connection with U.S. Appl. No. 11/126,871, filed May 11, 2005, 14 pages.
Non-Final Office Action dated Feb. 9, 2015, issued in connection with U.S. Appl. No. 11/126,871, filed May 11, 2005, 15 pages.
Non-Final Office Action dated Aug. 17, 2016, issued in connection with U.S. Appl. No. 13/798,977, filed Mar. 13, 2013, 31 pages.
Non-Final Office Action dated May 22, 2015, issued in connection with U.S. Appl. No. 13/848,585, filed Mar. 21, 2013, 15 pages.
Non-Final Office Action dated Aug. 24, 2010, issued in connection with U.S. Appl. No. 11/126,871, filed May 11, 2005, 22 pages.
Non-Final Office Action dated Dec. 28, 2015, issued in connection with U.S. Appl. No. 11/126,871, filed May 11, 2005, 17 pages.
Non-Final Office Action dated Oct. 28, 2016, issued in connection with U.S. Appl. No. 11/126,871, filed May 11, 2005, 20 pages.
Non-Final Office Action dated Nov. 30, 2012, issued in connection with U.S. Appl. No. 11/126,871, filed May 11, 2005, 16 pages.
Non-Final Office Action dated Mar. 31, 2009, issued in connection with U.S. Appl. No. 11/126,871, filed May 11, 2005, 19 pages.
PRISMIQ, Inc., "PRISMIQ Media Player User Guide," 2003, 44 pages.
"ReQuest Multimedia Selects Quantum Corporation to Provide Audio Storage Technology for New MP3 Home Stereo Jukebox," The Free Library, 1999 Business Wire, 3 pages.

(56) References Cited

OTHER PUBLICATIONS

Final Office Action dated Dec. 21, 2016, issued in connection with U.S. Appl. No. 13/798,977, filed Mar. 13, 2013, 32 pages.
Non-Final Office Action dated Dec. 13, 2016, issued in connection with U.S. Appl. No. 13/848,585, filed Mar. 21, 2013, 13 pages.
United States Patent and Trademark Office, U.S. Appl. No. 60/490,768, filed Jul. 28, 2003, entitled "Method for synchronizing audio playback between multiple networked devices," 13 pages.
United States Patent and Trademark Office, U.S. Appl. No. 60/825,407, filed Sep. 12, 2003, entitled "Controlling and manipulating groupings in a multi-zone music or media system," 82 pages.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.
"AudioTron Quick Start Guide, Version 1.0", Voyetra Turtle Beach, Inc., Mar. 2001, 24 pages.
"AudioTron Reference Manual, Version 3.0", Voyetra Turtle Beach, Inc., May 2002, 70 pages.
"AudioTron Setup Guide, Version 3.0", Voyetra Turtle Beach, Inc., May 2002, 38 pages.
Bluetooth. "Specification of the Bluetooth System: The ad hoc SCATTERNET for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.

International Searching Authority, International Search Report and Written Opinion dated Jun. 22, 2016, issued in connection with International Application No. PCT/US2016/026512, filed Apr. 7, 2016, 14 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo" Analog Stereo Jun. 24, 2000 retrieved Jun. 18, 2014, 2 pages.
"Denon 2003-2004 Product Catalog," Denon, 2003-2004, 44 pages.
Louderback, Jim, "Affordable Audio Receiver Furnishes Homes With MP3," TechTV Vault. Jun. 28, 2000 retrieved Jul. 10, 2014, 2 pages.
Palm, Inc., "Handbook for the Palm VII Handheld," May 2000, 311 pages.
Presentations at WinHEC 2000, May 2000, 138 pages.
UPnP; "Universal Plug and Play Device Architecture," Jun. 8, 2000; version 1.0; Microsoft Corporation; pp. 1-54.
Advisory Action dated Jul. 31, 2017, issued in connection with U.S. Appl. No. 11/126,871, filed May 11, 2005, 3 pages.
Final Office Action dated May 18, 2017, issued in connection with U.S. Appl. No. 11/126,871, filed May 11, 2005, 21 pages.
Non-Final Office Action dated Jun. 6, 2017, issued in connection with U.S. Appl. No. 14/682,628, filed Apr. 9, 2015, 15 pages.
Non-Final Office Action dated Aug. 16, 2017, issued in connection with U.S. Appl. No. 13/798,977, filed Mar. 13, 2013, 32 pages.
Non-Final Office Action dated Sep. 26, 2017, issued in connection with U.S. Appl. No. 11/126,871, filed May 11, 2005, 19 pages.
Notice of Allowance dated Apr. 19, 2017, issued in connection with U.S. Appl. No. 13/848,585, filed Mar. 21, 2013, 5 pages.

* cited by examiner

MEDIA CONTAINER ADDITION AND PLAYBACK WITHIN QUEUE

FIELD OF THE DISCLOSURE

The disclosure is related to consumer goods and, more particularly, to methods, systems, products, features, services, and other elements directed to media playback or some aspect thereof.

BACKGROUND

Options for accessing and listening to digital audio in an out-loud setting were limited until in 2003, when SONOS, Inc. filed for one of its first patent applications, entitled "Method for Synchronizing Audio Playback between Multiple Networked Devices," and began offering a media playback system for sale in 2005. The Sonos Wireless HiFi System enables people to experience music from many sources via one or more networked playback devices. Through a software control application installed on a smartphone, tablet, or computer, one can play what he or she wants in any room that has a networked playback device. Additionally, using the controller, for example, different songs can be streamed to each room with a playback device, rooms can be grouped together for synchronous playback, or the same song can be heard in all rooms synchronously.

Given the ever growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings where:

Figure 1:
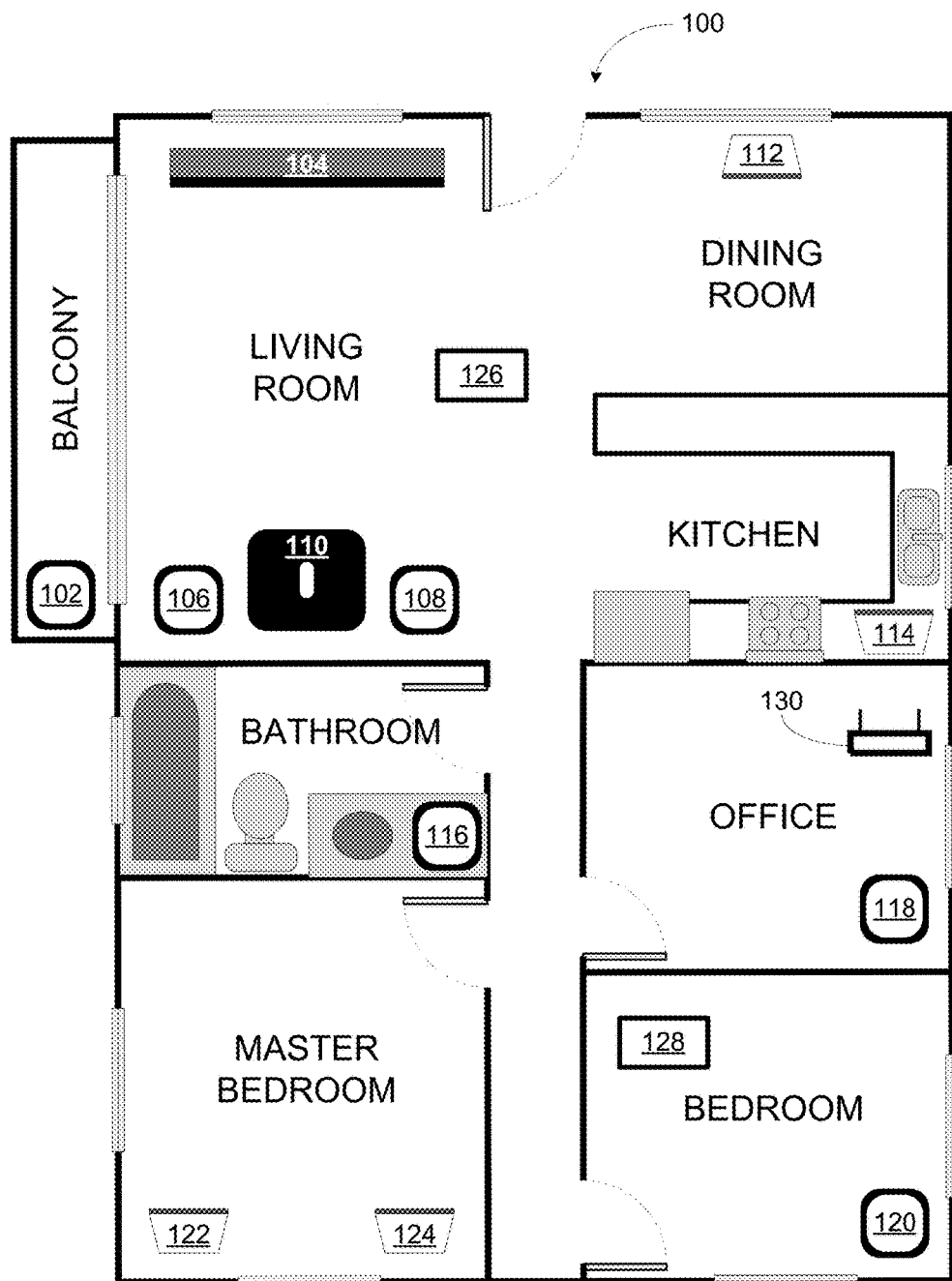
FIG. 1 shows an example media playback system configuration in which certain embodiments may be practiced.

The drawings are for the purpose of illustrating example embodiments, but it is understood that the inventions are not limited to the arrangements and instrumentality shown in the drawings.

DETAILED DESCRIPTION

I. Overview

Embodiments described herein may involve, inter alia, facilitating the tasks of (i) queuing a container of a media items, and (ii) initiating playback of the queue beginning with a particular media item from within that container. In practice, such operations may be relatively frequent, as some users may search or browse for a certain container (e.g., a playlist or album) by way of a known media item of that container (e.g., a favorite track from a playlist or album). According to some example techniques, when a media item (that is part of a container of media items) is selected, a control device may add all of the media items of the container to a queue of a playback device (perhaps rather than just the selected media item) and the playback device may initiate playback of the queue beginning with the selected media item from within that container.

Such techniques may reduce the number of user interface interactions involved in performing the above indicated tasks, which may improve the user experience. For instance, in some example systems, to add a playlist to a playback queue and play a media item in the middle of the playlist, the user might browse or search for the playlist, select the playlist, add the playlist to the queue, browse through the queue for the specific media item and then select the specific media item again to begin playing that media item. Example techniques described herein may reduce the number of steps involved in these tasks.

When adding a container of a media items to a queue, some example techniques described herein may queue the media items of the container based on the sequence indicated by the container. Some media item containers indicate a sequence (i.e., an order of playback) for the media items of the sequence. For instance, tracks of an album may include track numbers that indicate the respective positions of the tracks on the album. In aggregate, these track numbers indicate a sequence in which to playback the tracks of the album. As another example, a playlist of media items may indicate a sequence for the media items in the playlist (e.g., in order of the list). A control device may maintain such sequencing in the queue when adding the media items of the container to the queue.

By maintaining the sequencing of the container within the queue, transport controls associated with the queue may operate according to the sequencing of the container. For instance, when playing queued media items from a container, a media playback system may respond to a "skip forward" or "skip back" input by skipping forward or skipping backward to the subsequent or previous media item as indicated by the container's sequence. In some cases, such functionality may improve the user experience, as some users may expect or prefer certain sequencing of media items.

In some cases, the particular container of media items that is ultimately queued may depend upon the particular instance of the media item that is selected. In practice, media playback systems may have access to multiple instances of the same media item, perhaps with each instance belonging to a different container. Browsing or searching for a particular media item may return multiple instances of a given media item, perhaps with each instance belonging to a respective container. For example, a media playback system may have access to the media items of a streaming music service, which might provide a first instance of a given song as part of the album on which the song was released and a second instance of the song as part of a compilation album (e.g., a greatest hits compilation). Other example instances of a given song that might be available to a media playback system include instances of the song as provided by other streaming media services or locally-stored instances of the song, among other examples. Within embodiments, a selected instance of a given media item may belong to a particular container and a control device may queue that container based on that particular instance being selected.

As indicated above, example techniques may facilitate certain tasks related to queuing a container of a media items, and initiating playback of the queue beginning with a particular media item from within that container. In one aspect, a method is provided. The method may involve displaying a control interface that includes an indication of one or more playable media items, the one or more playable items including at least one instance of a given media item. The method may also involve detecting input data indicating a selection of a particular instance of the given media item from among the one or more playable media items. The method may involve identifying a container of two or more media items, the container including the particular instance of the given media item and indicating a sequence for the two or more media items. The method may further involve inserting the two or more media items of the identified container into a queue such that the two or more media items follow the indicated sequence within the queue and causing one or more playback devices of a media playback system to initiate playback of the queue beginning with the given media item.

In another aspect, a device is provided. The device includes a network interface, at least one processor, a data storage, and program logic stored in the data storage and executable by the at least one processor to perform functions. The functions may include displaying a control interface that includes an indication of one or more playable media items, the one or more playable items including at least one instance of a given media item. The functions may also include detecting input data indicating a selection of a particular instance of the given media item from among the one or more playable media items. The functions may include identifying a container of two or more media items, the container including the particular instance of the given media item and indicating a sequence for the two or more media items. The functions may further include inserting the two or more media items of the identified container into a queue such that the two or more media items follow the indicated sequence within the queue and causing one or more playback devices of a media playback system to initiate playback of the queue beginning with the given media item.

In yet another aspect, a non-transitory computer readable memory is provided. The non-transitory computer readable memory has stored thereon instructions executable by a computing device to cause the computing device to perform functions. The functions may include displaying a control interface that includes an indication of one or more playable media items, the one or more playable items including at least one instance of a given media item. The functions may also include detecting input data indicating a selection of a particular instance of the given media item from among the one or more playable media items. The functions may include identifying a container of two or more media items, the container including the particular instance of the given media item and indicating a sequence for the two or more media items. The functions may further include inserting the two or more media items of the identified container into a queue such that the two or more media items follow the indicated sequence within the queue and causing one or more playback devices of a media playback system to initiate playback of the queue beginning with the given media item.

In yet another aspect, another method is provided. The method may involve receiving, via the network interface, data indicating a particular instance of a given media item that was selected for playback. The method may also involve identifying a container of two or more media items, the container including the particular instance of the given media item that was selected for playback and indicating a sequence for the two or more media items. The method may further involve inserting the two or more media items of the identified container into a queue of the playback device such that the two or more media items follow the indicated sequence within the queue and initiating play back of the queue beginning with the given media item.

In another aspect, a device is provided. The device includes a network interface, at least one processor, a data storage, and program logic stored in the data storage and executable by the at least one processor to perform functions. The functions may include receiving, via the network interface, data indicating a particular instance of a given media item that was selected for playback. The functions may also include identifying a container of two or more media items, the container including the particular instance of the given media item that was selected for playback and indicating a sequence for the two or more media items. The functions may further include inserting the two or more media items of the identified container into a queue of the playback device such that the two or more media items follow the indicated sequence within the queue and initiating play back of the queue beginning with the given media item.

In yet another aspect, a non-transitory computer readable memory is provided. The non-transitory computer readable memory has stored thereon instructions executable by a computing device to cause the computing device to perform functions. The functions may include receiving, via the network interface, data indicating a particular instance of a given media item that was selected for playback. The functions may also include identifying a container of two or more media items, the container including the particular instance of the given media item that was selected for playback and indicating a sequence for the two or more media items. The functions may further include inserting the two or more media items of the identified container into a queue of the playback device such that the two or more media items follow the indicated sequence within the queue and initiating play back of the queue beginning with the given media item.

It will be understood by one of ordinary skill in the art that this disclosure includes numerous other embodiments. It will be understood by one of ordinary skill in the art that this disclosure includes numerous other embodiments. While some examples described herein may refer to functions performed by given actors such as "users" and/or other entities, it should be understood that this description is for purposes of explanation only. The claims should not be interpreted to require action by any such example actor unless explicitly required by the language of the claims themselves.

II. Example Operating Environment

FIG. 1 illustrates an example configuration of a media playback system 100 in which one or more embodiments disclosed herein may be practiced or implemented. The media playback system 100 as shown is associated with an example home environment having several rooms and spaces, such as for example, a master bedroom, an office, a dining room, and a living room. As shown in the example of FIG. 1, the media playback system 100 includes playback devices 102-124, control devices 126 and 128, and a wired or wireless network router 130.

Further discussions relating to the different components of the example media playback system 100 and how the different components may interact to provide a user with a media experience may be found in the following sections. While discussions herein may generally refer to the example media playback system 100, technologies described herein are not limited to applications within, among other things, the home environment as shown in FIG. 1. For instance, the technologies described herein may be useful in environments where multi-zone audio may be desired, such as, for example, a commercial setting like a restaurant, mall or airport, a vehicle like a sports utility vehicle (SUV), bus or car, a ship or boat, an airplane, and so on.

a. Example Playback Devices

Figure 2:
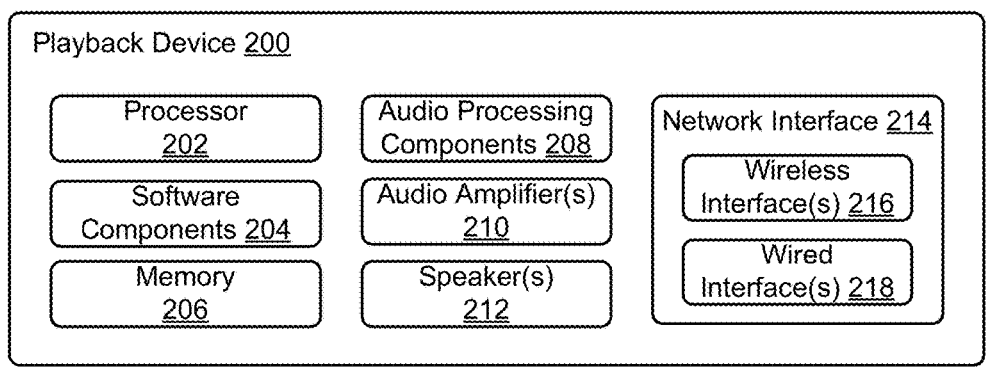
FIG. 2 shows a functional block diagram of an example playback device.

FIG. 2 shows a functional block diagram of an example playback device 200 that may be configured to be one or more of the playback devices 102-124 of the media playback system 100 of FIG. 1. The playback device 200 may include a processor 202, software components 204, memory 206, audio processing components 208, audio amplifier(s) 210, speaker(s) 212, and a network interface 214 including wireless interface(s) 216 and wired interface(s) 218. In one case, the playback device 200 may not include the speaker(s) 212, but rather a speaker interface for connecting the playback device 200 to external speakers. In another case, the playback device 200 may include neither the speaker(s) 212 nor the audio amplifier(s) 210, but rather an audio interface for connecting the playback device 200 to an external audio amplifier or audio-visual receiver.

In one example, the processor 202 may be a clock-driven computing component configured to process input data according to instructions stored in the memory 206. The memory 206 may be a tangible computer-readable medium configured to store instructions executable by the processor 202. For instance, the memory 206 may be data storage that can be loaded with one or more of the software components 204 executable by the processor 202 to achieve certain functions. In one example, the functions may involve the playback device 200 retrieving audio data from an audio source or another playback device. In another example, the functions may involve the playback device 200 sending audio data to another device or playback device on a network. In yet another example, the functions may involve pairing of the playback device 200 with one or more playback devices to create a multi-channel audio environment.

Certain functions may involve the playback device 200 synchronizing playback of audio content with one or more other playback devices. During synchronous playback, a listener will preferably not be able to perceive time-delay differences between playback of the audio content by the playback device 200 and the one or more other playback devices. U.S. Pat. No. 8,234,395 entitled, "System and method for synchronizing operations among a plurality of independently clocked digital data processing devices," which is hereby incorporated by reference, provides in more detail some examples for audio playback synchronization among playback devices.

The memory 206 may further be configured to store data associated with the playback device 200, such as one or more zones and/or zone groups the playback device 200 is a part of, audio sources accessible by the playback device 200, or a playback queue that the playback device 200 (or some other playback device) may be associated with. The data may be stored as one or more state variables that are periodically updated and used to describe the state of the playback device 200. The memory 206 may also include the data associated with the state of the other devices of the media system, and shared from time to time among the devices so that one or more of the devices have the most recent data associated with the system. Other embodiments are also possible.

The audio processing components 208 may include one or more digital-to-analog converters (DAC), an audio preprocessing component, an audio enhancement component or a digital signal processor (DSP), and so on. In one embodiment, one or more of the audio processing components 208 may be a subcomponent of the processor 202. In one example, audio content may be processed and/or intentionally altered by the audio processing components 208 to produce audio signals. The produced audio signals may then be provided to the audio amplifier(s) 210 for amplification and playback through speaker(s) 212. Particularly, the audio amplifier(s) 210 may include devices configured to amplify audio signals to a level for driving one or more of the speakers 212. The speaker(s) 212 may include an individual transducer (e.g., a "driver") or a complete speaker system involving an enclosure with one or more drivers. A particular driver of the speaker(s) 212 may include, for example, a subwoofer (e.g., for low frequencies), a mid-range driver (e.g., for middle frequencies), and/or a tweeter (e.g., for high frequencies). In some cases, each transducer in the one or more speakers 212 may be driven by an individual corresponding audio amplifier of the audio amplifier(s) 210. In addition to producing analog signals for playback by the playback device 200, the audio processing components 208 may be configured to process audio content to be sent to one or more other playback devices for playback.

Audio content to be processed and/or played back by the playback device 200 may be received from an external source, such as via an audio line-in input connection (e.g., an auto-detecting 3.5 mm audio line-in connection) or the network interface 214.

The network interface 214 may be configured to facilitate a data flow between the playback device 200 and one or more other devices on a data network. As such, the playback device 200 may be configured to receive audio content over the data network from one or more other playback devices in communication with the playback device 200, network devices within a local area network, or audio content sources over a wide area network such as the Internet. In one example, the audio content and other signals transmitted and received by the playback device 200 may be transmitted in the form of digital packet data containing an Internet Protocol (IP)-based source address and IP-based destination addresses. In such a case, the network interface 214 may be configured to parse the digital packet data such that the data destined for the playback device 200 is properly received and processed by the playback device 200.

As shown, the network interface 214 may include wireless interface(s) 216 and wired interface(s) 218. The wireless interface(s) 216 may provide network interface functions for the playback device 200 to wirelessly communicate with other devices (e.g., other playback device(s), speaker(s), receiver(s), network device(s), control device(s) within a data network the playback device 200 is associated with) in accordance with a communication protocol (e.g., any wireless standard including IEEE 802.11a, 802.11b, 802.11g, 802.11n, 802.11 ac, 802.15, 4G mobile communication standard, and so on). The wired interface(s) 218 may provide network interface functions for the playback device 200 to communicate over a wired connection with other devices in accordance with a communication protocol (e.g., IEEE 802.3). While the network interface 214 shown in FIG. 2 includes both wireless interface(s) 216 and wired interface(s) 218, the network interface 214 may in some embodiments include only wireless interface(s) or only wired interface(s).

In one example, the playback device 200 and one other playback device may be paired to play two separate audio components of audio content. For instance, playback device 200 may be configured to play a left channel audio component, while the other playback device may be configured to play a right channel audio component, thereby producing or enhancing a stereo effect of the audio content. The paired playback devices (also referred to as "bonded playback devices") may further play audio content in synchrony with other playback devices.

In another example, the playback device 200 may be sonically consolidated with one or more other playback devices to form a single, consolidated playback device. A consolidated playback device may be configured to process and reproduce sound differently than an unconsolidated playback device or playback devices that are paired, because a consolidated playback device may have additional speaker drivers through which audio content may be rendered. For instance, if the playback device 200 is a playback device designed to render low frequency range audio content (i.e. a subwoofer), the playback device 200 may be consolidated with a playback device designed to render full frequency range audio content. In such a case, the full frequency range playback device, when consolidated with the low frequency playback device 200, may be configured to render only the mid and high frequency components of audio content, while the low frequency range playback device 200 renders the low frequency component of the audio content. The consolidated playback device may further be paired with a single playback device or yet another consolidated playback device.

By way of illustration, SONOS, Inc. presently offers (or has offered) for sale certain playback devices including a "PLAY:1," "PLAY:3," "PLAY:5," "PLAYBAR," "CONNECT:AMP," "CONNECT," and "SUB." Any other past, present, and/or future playback devices may additionally or alternatively be used to implement the playback devices of example embodiments disclosed herein. Additionally, it is understood that a playback device is not limited to the example illustrated in FIG. 2 or to the SONOS product offerings. For example, a playback device may include a wired or wireless headphone. In another example, a playback device may include or interact with a docking station for personal mobile media playback devices. In yet another example, a playback device may be integral to another device or component such as a television, a lighting fixture, or some other device for indoor or outdoor use.

b. Example Playback Zone Configurations

Referring back to the media playback system 100 of FIG. 1, the environment may have one or more playback zones, each with one or more playback devices. The media playback system 100 may be established with one or more playback zones, after which one or more zones may be added, or removed to arrive at the example configuration shown in FIG. 1. Each zone may be given a name according to a different room or space such as an office, bathroom, master bedroom, bedroom, kitchen, dining room, living room, and/or balcony. In one case, a single playback zone may include multiple rooms or spaces. In another case, a single room or space may include multiple playback zones.

As shown in FIG. 1, the balcony, dining room, kitchen, bathroom, office, and bedroom zones each have one playback device, while the living room and master bedroom zones each have multiple playback devices. In the living room zone, playback devices 104, 106, 108, and 110 may be configured to play audio content in synchrony as individual playback devices, as one or more bonded playback devices, as one or more consolidated playback devices, or any combination thereof. Similarly, in the case of the master bedroom, playback devices 122 and 124 may be configured to play audio content in synchrony as individual playback devices, as a bonded playback device, or as a consolidated playback device.

In one example, one or more playback zones in the environment of FIG. 1 may each be playing different audio content. For instance, the user may be grilling in the balcony zone and listening to hip hop music being played by the playback device 102 while another user may be preparing food in the kitchen zone and listening to classical music being played by the playback device 114. In another example, a playback zone may play the same audio content in synchrony with another playback zone. For instance, the user may be in the office zone where the playback device 118 is playing the same rock music that is being playing by playback device 102 in the balcony zone. In such a case, playback devices 102 and 118 may be playing the rock music in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the media playback system 100 may be dynamically modified, and in some embodiments, the media playback system 100 supports numerous configurations. For instance, if a user physically moves one or more playback devices to or from a zone, the media playback system 100 may be reconfigured to accommodate the change(s). For instance, if the user physically moves the playback device 102 from the balcony zone to the office zone, the office zone may now include both the playback device 118 and the playback device 102. The playback device 102 may be paired or grouped with the office zone and/or renamed if so desired via a control device such as the control devices 126 and 128. On the other hand, if the one or more playback devices are moved to a particular area in the home environment that is not already a playback zone, a new playback zone may be created for the particular area.

Further, different playback zones of the media playback system 100 may be dynamically combined into zone groups or split up into individual playback zones. For instance, the dining room zone and the kitchen zone 114 may be combined into a zone group for a dinner party such that playback devices 112 and 114 may render audio content in synchrony. On the other hand, the living room zone may be split into a television zone including playback device 104, and a listening zone including playback devices 106, 108, and 110, if the user wishes to listen to music in the living room space while another user wishes to watch television.

c. Example Control Devices

Figure 3:
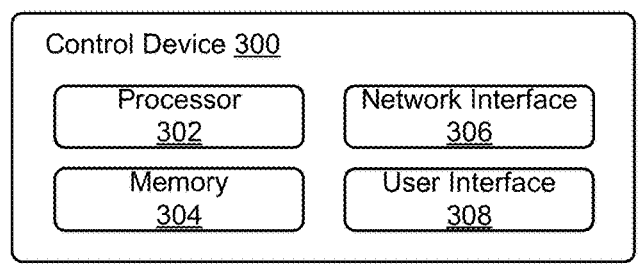
FIG. 3 shows a functional block diagram of an example control device.

FIG. 3 shows a functional block diagram of an example control device 300 that may be configured to be one or both of the control devices 126 and 128 of the media playback system 100. Control device 300 may also be referred to as a controller 300. As shown, the control device 300 may include a processor 302, memory 304, a network interface 306, and a user interface 308. In one example, the control device 300 may be a dedicated controller for the media playback system 100. In another example, the control device 300 may be a network device on which media playback system controller application software may be installed, such as for example, an iPhone™, iPad™ or any other smart phone, tablet or network device (e.g., a networked computer such as a PC or Mac™).

The processor 302 may be configured to perform functions relevant to facilitating user access, control, and configuration of the media playback system 100. The memory 304 may be configured to store instructions executable by the processor 302 to perform those functions. The memory 304 may also be configured to store the media playback system controller application software and other data associated with the media playback system 100 and the user.

In one example, the network interface 306 may be based on an industry standard (e.g., infrared, radio, wired standards including IEEE 802.3, wireless standards including IEEE 802.11a, 802.11b, 802.11g, 802.11n, 802.11ac, 802.15, 4G mobile communication standard, and so on). The network interface 306 may provide a means for the control device 300 to communicate with other devices in the media playback system 100. In one example, data and information (e.g., such as a state variable) may be communicated between control device 300 and other devices via the network interface 306. For instance, playback zone and zone group configurations in the media playback system 100 may be received by the control device 300 from a playback device or another network device, or transmitted by the control device 300 to another playback device or network device via the network interface 306. In some cases, the other network device may be another control device.

Playback device control commands such as volume control and audio playback control may also be communicated from the control device 300 to a playback device via the network interface 306. As suggested above, changes to configurations of the media playback system 100 may also be performed by a user using the control device 300. The configuration changes may include adding/removing one or more playback devices to/from a zone, adding/removing one or more zones to/from a zone group, forming a bonded or consolidated player, separating one or more playback devices from a bonded or consolidated player, among others. Accordingly, the control device 300 may sometimes be referred to as a controller, whether the control device 300 is a dedicated controller or a network device on which media playback system controller application software is installed.

Figure 4:
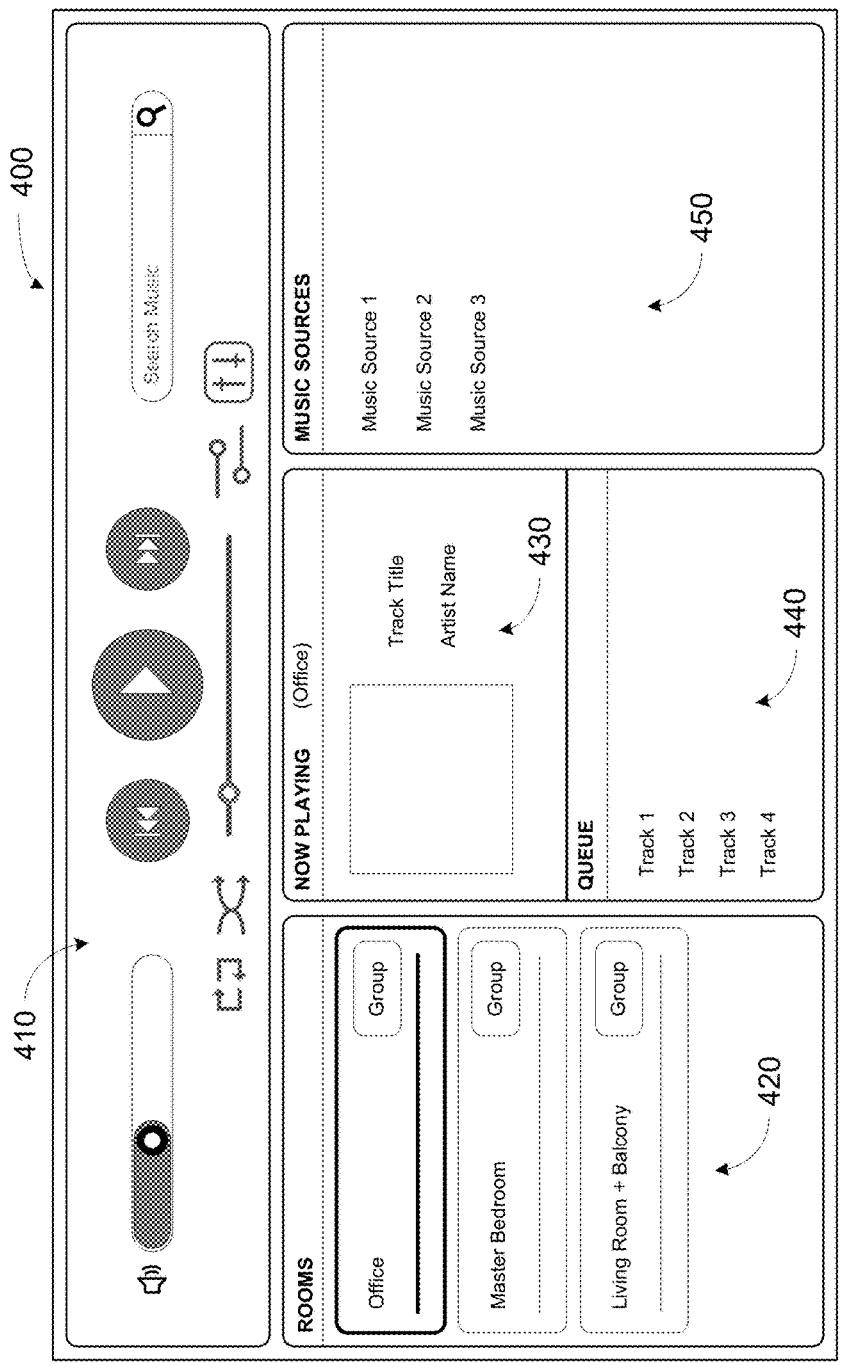
FIG. 4 shows an example controller interface.

The user interface 308 of the control device 300 may be configured to facilitate user access and control of the media playback system 100, by providing a controller interface such as the controller interface 400 shown in FIG. 4. The controller interface 400 includes a playback control region 410, a playback zone region 420, a playback status region 430, a playback queue region 440, and an audio content sources region 450. The user interface 400 as shown is just one example of a user interface that may be provided on a network device such as the control device 300 of FIG. 3 (and/or the control devices 126 and 128 of FIG. 1) and accessed by users to control a media playback system such as the media playback system 100. Other user interfaces of varying formats, styles, and interactive sequences may alternatively be implemented on one or more network devices to provide comparable control access to a media playback system.

The playback control region 410 may include selectable (e.g., by way of touch or by using a cursor) icons to cause playback devices in a selected playback zone or zone group to play or pause, fast forward, rewind, skip to next, skip to previous, enter/exit shuffle mode, enter/exit repeat mode, enter/exit cross fade mode. The playback control region 410 may also include selectable icons to modify equalization settings, and playback volume, among other possibilities.

The playback zone region 420 may include representations of playback zones within the media playback system 100. In some embodiments, the graphical representations of playback zones may be selectable to bring up additional selectable icons to manage or configure the playback zones in the media playback system, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface such as the user interface 400 are also possible. The representations of playback zones in the playback zone region 420 may be dynamically updated as playback zone or zone group configurations are modified.

The playback status region 430 may include graphical representations of audio content that is presently being played, previously played, or scheduled to play next in the selected playback zone or zone group. The selected playback zone or zone group may be visually distinguished on the user interface, such as within the playback zone region 420 and/or the playback status region 430. The graphical representations may include track title, artist name, album name, album year, track length, and other relevant information that may be useful for the user to know when controlling the media playback system via the user interface 400.

The playback queue region 440 may include graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streaming audio content, such as Internet radio that may continue to play until otherwise stopped, rather than discrete audio items that have playback durations. In an alternative embodiment, a playback queue can include Internet radio and/or other streaming audio content items and be "in use"

when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped. Other examples are also possible.

Referring back to the user interface 400 of FIG. 4, the graphical representations of audio content in the playback queue region 440 may include track titles, artist names, track lengths, and other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device. Playback of such a playback queue may involve one or more playback devices playing back media items of the queue, perhaps in sequential or random order.

The audio content sources region 450 may include graphical representations of selectable audio content sources from which audio content may be retrieved and played by the selected playback zone or zone group. Discussions pertaining to audio content sources may be found in the following section.

d. Example Audio Content Sources

As indicated previously, one or more playback devices in a zone or zone group may be configured to retrieve for playback audio content (e.g., according to a corresponding URI or URL for the audio content) from a variety of available audio content sources. In one example, audio content may be retrieved by a playback device directly from a corresponding audio content source (e.g., a line-in connection). In another example, audio content may be provided to a playback device over a network via one or more other playback devices or network devices.

Example audio content sources may include a memory of one or more playback devices in a media playback system such as the media playback system 100 of FIG. 1, local music libraries on one or more network devices (such as a control device, a network-enabled personal computer, or a networked-attached storage (NAS), for example), streaming audio services providing audio content via the Internet (e.g., the cloud), or audio sources connected to the media playback system via a line-in input connection on a playback device or network devise, among other possibilities.

In some embodiments, audio content sources may be regularly added or removed from a media playback system such as the media playback system 100 of FIG. 1. In one example, an indexing of audio items may be performed whenever one or more audio content sources are added, removed or updated. Indexing of audio items may involve scanning for identifiable audio items in all folders/directory shared over a network accessible by playback devices in the media playback system, and generating or updating an audio content database containing metadata (e.g., title, artist, album, track length, among others) and other associated information, such as a URI or URL for each identifiable audio item found. Other examples for managing and maintaining audio content sources may also be possible.

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

Figure 5:
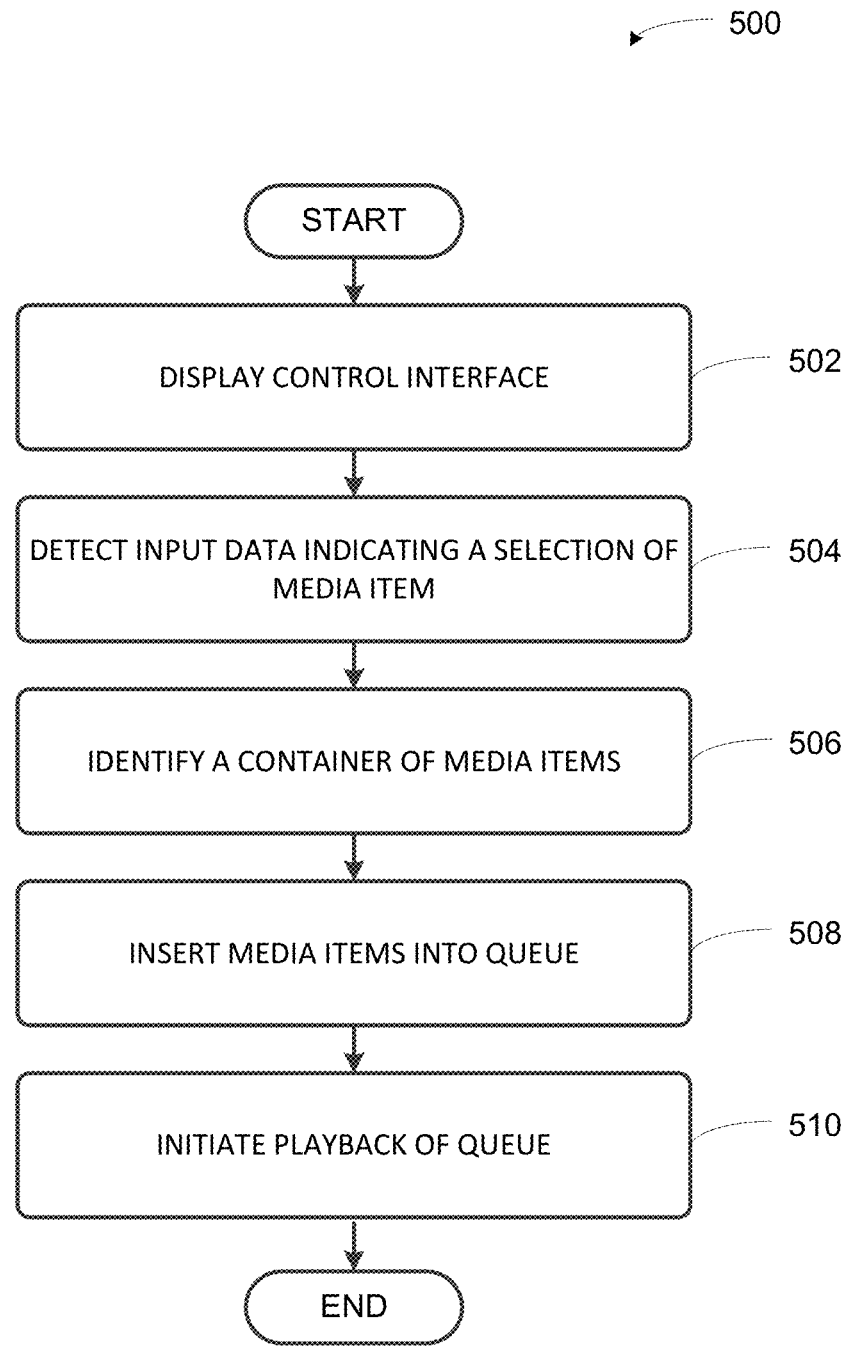
FIG. 5 shows an example flow diagram to facilitate adding a container of media items to a queue and initiating playback of the queue.
Figure 8:
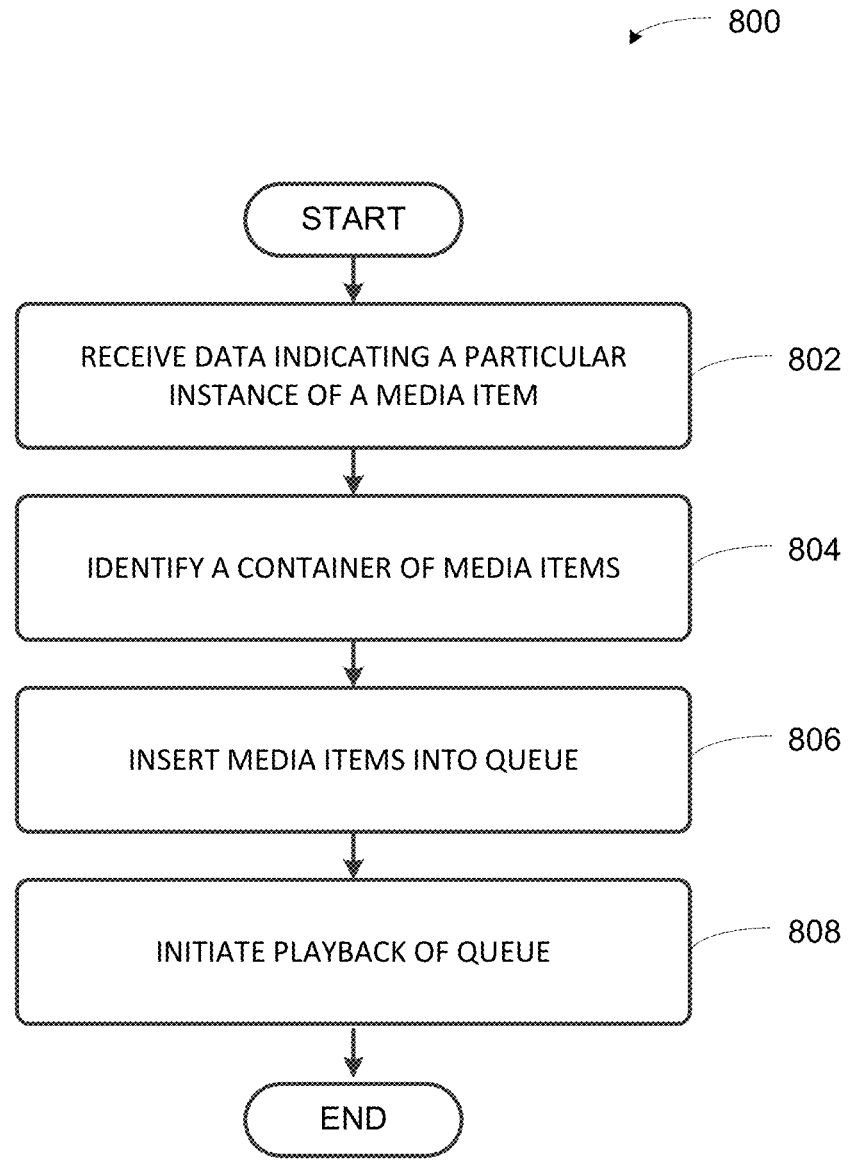
FIG. 8 shows another example flow diagram to facilitate adding a container of media items to a queue and initiating playback of the queue.

Methods 800 and 800 shown in FIGS. 5 and 8, respectively, present embodiments of methods that can be implemented within an operating environment including, for example, the media playback system 100 of FIG. 1, one or more of the playback device 200 of FIG. 2, or one or more of the control device 300 of FIG. 3. Further, operations illustrated by way of example as being performed by a media playback system can be performed by any suitable device, such as a playback device or a control device of a media playback system. Methods 500 and 800 may include one or more operations, functions, or actions as illustrated by one or more of blocks shown in FIGS. 5 and 8, respectively. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the methods and other processes disclosed herein, the flowcharts show functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache, and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the methods and other processes disclosed herein, each block may represent circuitry that is wired to perform the specific logical functions in the process.

III. Example Techniques to Facilitate Queuing and Playback

As discussed above, embodiments described herein may facilitate certain tasks related to adding a container of media items to a queue and initiating playback of the queue. FIG. 5 illustrates an example method 500 to facilitate (i) queuing a container of a media items, and (ii) initiating playback of the queue beginning with a particular media item from within that container a. Display A Control Interface At block 502, method 500 involves displaying a control interface. For instance, a control device, such as control device 126 of media playback system 100, may display a control interface (e.g., control interface 400 of FIG. 4), which includes an indication of one or more playable media items. In some embodiments, the control interface may include selectable controls corresponding to the one or more playable items, such that by selection of a selectable control, input data indicating selection of a particular playable media item is generated. Within examples, a control device may queue a selected media item in a queue for playback.

Control interfaces may indicate playable media items using different techniques. For instance, a control interface may include a list of media items that are available for playback by a media playback system. As another example, a control interface may include a search control and indicate playable media items as search results for a particular search query. Alternatively, a control interface may include a browse structure by which playable media items are displayed to be browsed. For instance, in an example browse structure, media items may be organized in a tree structure that is sorted by characteristics of the media items (e.g., artist name or album title).

In some examples, a control system may display a control interface with a search control. Media items that a media playback system has access to can be searched by way of the search control. The control interface may include the search results of a given search. Such search results may indicate one or more playable items returned by the search.

Figure 6:
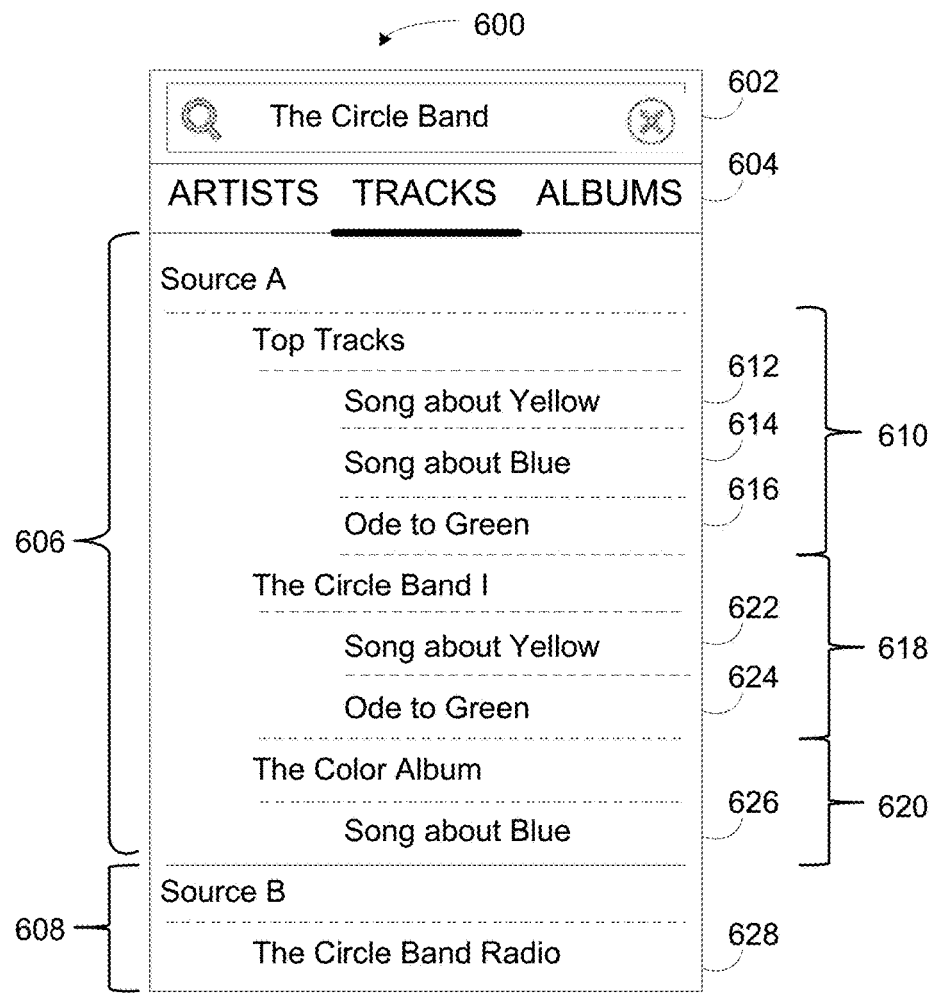
FIG. 6 shows another example controller interface.

For example, FIG. 6 illustrates an example control interface 600 that includes a search control 602. A control device of a media playback system may search the media items available to the media playback system for media items that match search queries entered into search control 602. To illustrate, an example search query for a fictional artist ("The Circle Band") is entered into search control 602, as shown.

Control interface 600 also includes an indication of search results for the example search query. By way of graphical control 604, these search results may be sorted by Artist, Track, or Album, among other possible examples. As shown in FIG. 6, the "Tracks" option of graphical control 604 is selected, so as to sort the search results for the example search query by Track. Among the search results displayed for the example search query are search results 606 containing media items from a first source (Source A), which is a streaming music service, and search results 608 containing media items from a second source (Source B), which is an internet radio service.

Search results 606 are divided into containers (e.g., playlists and albums) of media items. In particular, search results 606 include a "Top Tracks" playlist 610 containing popular tracks by the fictional artist. When selected, selectable control 612 indicates a selection of the particular instance of fictional song "Song about Yellow" that is in "Top Tracks" playlist 610. Likewise, selectable controls 614 and 616, when selected, indicate selections of the particular instance of the fictional songs "Song about Blue" and "Ode to Green" that are in "Top Tracks" playlist 610.

The search results 606 from Source A also include fictional albums 618 ("The Circle Band I") and 620 ("The Color Album") by the fictional artist, which are containers of tracks from the respective albums. As shown, album 618 includes fictional songs "Song about Yellow" and "Ode to Green." When selected, selectable control 622 indicates a selection of the particular instance of fictional song "Song about Yellow" that is in album 618 (rather than the instance that is in "Top Tracks" playlist 610). Likewise, selectable control 624 indicates a selection of the particular instance of fictional song "Ode to Green" that is in album 618. Album 620 includes fictional song "Song about Blue." When selected, selectable control 626 indicates a selection of the particular instance of fictional song "Song about Blue" that is in album 620.

As noted above, search results 608 contain media items from a second source (Source B), which is an internet radio service. When selected, selectable control 628 indicates a selection of a particular internet radio channel containing tracks related to the fictional artist "The Circle Band."

Figure 7:
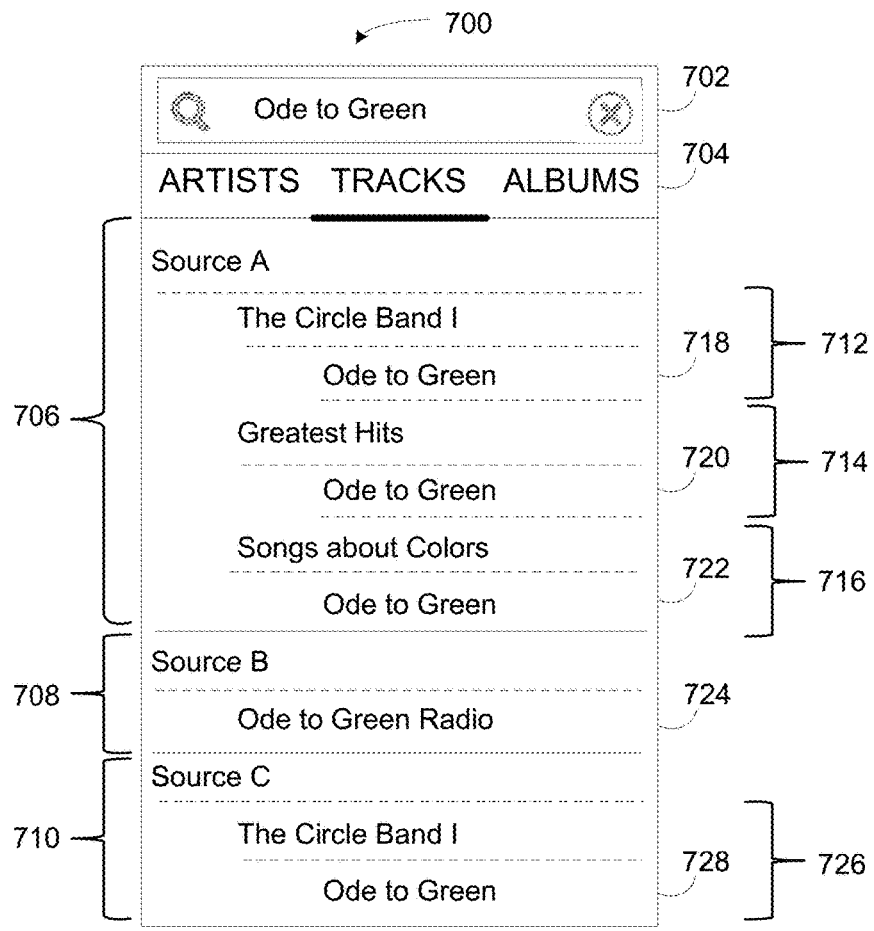
FIG. 7 shows a further example controller interface.

As another example, FIG. 7 illustrates an example control interface 700 that includes a search control 702. A control device of a media playback system may search the media items available to the media playback system for media items that match search queries entered into search control 702. To illustrate, an example search query for a fictional song ("Ode to Green") is entered into search control 702, as shown.

Control interface 700 also includes an indication of search results for the example search query for the fictional song. By way of graphical control 704, these search results may be sorted by Artist, Track, or Album, among other possible examples. As shown in FIG. 7, the "Tracks" option of graphical control 704 is selected, so as to sort the search results for the example search query by Track. Among the search results displayed for the example search query are search results 706 containing media items from a first source (Source A), which is a streaming music service, search results 708 containing media items from a second source (Source B), which is an internet radio service, and search results 710 from a third source (Source C), which is local data storage (e.g., memory 304 of control device 300 or a local data storage that is accessible to the control device within a local area network).

Search results 706 are divided into containers (e.g., playlists and albums) of media items that include the fictional song "Ode to Green." In particular, search results 706 include a "The Circle Band I" album 712 containing a first instance of the song "Ode to Green" and a "Greatest Hits" album 714 containing a second instance of "Ode to Green." Search results 706 also includes a playlist 716 ("Songs about Colors") containing media items including a third instance of "Ode to Green." A streaming music service may provide such a playlist to fit a particular mood. When selected, selectable control 718 indicates a selection of the particular instance of the fictional song that is in album 712. Likewise, selectable control 720, when selected, indicates a selection of the particular instance of the fictional song that is in album 714. And, selectable control 722, when selected, indicates a selection of the particular instance of the fictional song that is in playlist 716.

Search results 708 contain media items from a second source (Source B), which is an internet radio service. When selected, selectable control 724 indicates a selection of a particular internet radio channel containing a fourth instance of the fictional song "Ode to Green" and well as other tracks related to the fictional song.

Search results 710 contain media items from a third source (Source C), which is local data storage. Search results 710 include a "The Circle Band I" album 726 containing a fifth instance of the song "Ode to Green." When selected, selectable control 726 indicates a selection of the particular instance of the fictional song that is in album 726 and sourced from Source C. Selectable control 728, when selected, indicates a selection of the particular instance of the fictional song that is sourced from Source C.

As noted above, other control interfaces may display an indication of playable items in a different form, such in a list of media items that are available for playback by a media playback system or in a browse structure by which playable media items are presented for browsing. Further examples are contemplated as well.

Containers, such as the albums, playlists, and radio channels noted above in connection with FIGS. 6 and 7, may indicate a sequence for the media items within the container. For instance, tracks of an album have metadata indicating track numbers. These track numbers that indicate the respective positions of the tracks on the album. In sum, these track numbers may indicate a sequence in which to playback the tracks of the album. As another example, a playlist of media items may indicate a sequence for the media items in the playlist (e.g., in order of the list).

b. Detect Input Data Indicating a Selection of a Media Item

Referring back to FIG. 5, at block 504, method 500 involves detecting input data indicating a selection of a media item. For instance, a control device may detect input data at a control interface, such as control interface 400 of FIG. 4, control interface 600 of FIG. 6, or control interface 700 of FIG. 7. Such input data may indicates a selection of a particular instance of a given media item.

Selection of a media item may indicate intent to playback that media item. Moreover, selection of a particular instance of that media item may further indicate intent to playback that particular instance. Instances of a given song may differ from one another in various ways. Instances of a given song on different albums may be different recordings of the song. Instances of a given song from different sources may have different quality (e.g., bitrate). Moreover, instances of a given song within different containers are associated with the other songs in the container. Selection of an instance of a given song that is part of a particular container may indicate an interest in the other songs within the container (perhaps in addition to an interest in the selected instance of the given song).

As noted above, a control interface may include an indication of playable media items, perhaps by displaying selectable control(s) that, when selected, indicate selection of an instance of a media item. For example, in FIG. 6, control interface 600 includes selectable controls 612, 614, 616, 622, 624, 626, and 628, which indicate respective playable media items. After displaying control interface 600, a control device may detect input data indicating a selection of a given selectable control (e.g., one of selectable controls 612, 614, 616, 622, 624, 626, or 628). As another example, in FIG. 7, control interface 700 includes selectable controls 718, 720, 722, 724, and 728, which indicate respective playable media items. In operation, a control device may detect input data at control interface 700 indicating a selection of a given selectable control, so as to indicate a selection of a particular instance of a given media item (i.e., the song "Ode to Green.")

Within examples, the input data may indicate a particular instance of a media item that is part of a container. As noted above, a container may indicate a sequence for the media items within the container. In some cases, a control device may detect input data indicating a selection of a particular instance of a given media item that is positioned within the sequence after a media item that is positioned first within the sequence. In other words, the input data may indicate a selection of a media item that is not the first item in the sequence (e.g., the 2nd, 3rd, or 4th media item in the sequence). Selection of such a media item may indicate an interest in that particular media item (perhaps in addition to an interest in the container).

Within examples, the control device may detect a particular type of selection. For instance, a first type of input might be a single-click input, while a second type of input might be a double-click input. Alternatively, the first type of input might be a tap input, while a second type of input might be a tap and hold input. A control device might respond to one type of input (e.g., the first type) by adding the selected instance of the media item to a queue and response to the other type of input (e.g., the second type) by adding the container that includes the selected instance of the media item to the queue.

c. Identify a Container of Media Items

In FIG. 5, at block 506, method 500 involves identifying a container of media items. For example, a control device may identify a container of two or more media items. The control device may identify the container that includes the particular instance of the given media item (e.g., the playlist or album that includes the selected instance of the media item).

To identify the container, the control device may determine that the input data indicates that a particular instance of the given media item was selected. With a streaming music service, media items of the service may be associated with respective URI (uniform resource identifier) indicating a location from which to streaming the media item. Such URI's may uniquely identify the selected instance of the media item among the other media items of the service. Once the selected instance is identified, the control device may query the streaming media service for the container to which the selected instance belongs. The streaming media service may respond to such a query by indicating a container (e.g., the particular playlist or album) of which selected instance is a member.

To illustrate, referring back to FIG. 6, a control device may detect a selection of one of the selectable controls. For instance, a control device may detect input data indicating a selection of selectable control 624, which indicates a selection of a particular instance of the song "Ode to Green." Upon detecting such input data, the control device may identify album 618 ("The Circle Band I"), which includes the selected instance of the song. As another example, the control device might detect input data indicating a selection of selectable control 616, which indicates a selection of another instance of the song "Ode to Green." Upon detecting such input data, the control device may identify playlist 610 (containing "Top Tracks" by the fictional band "The Circle Band"), which includes the second instance of the song.

In some cases, the control device may identify the container by determining that metadata associated with the selected instance indicates a particular container. Some file formats to store media items, such as MPEG Level 3, include metadata describing certain characteristics of the media items (e.g., the album on which the selected instance of the media item was released). For example, the selected instance of the given media item might be a song stored in local storage. This song may be stored as a file in a file format that includes metadata. Such metadata may indicate the album of the song. To illustrate, in FIG. 7, album 726 sourced from Source C may include media items that are stored in local data storage. Such media items may be associated with metadata that indicates that they are part of album 726.

d. Insert Media Items into a Queue

Referring back to FIG. 5, at block 508, method 500 involves inserting the media items into the queue. For instance, a control device, such as control device 300, may insert the two or more media items of the identified container into a queue. As noted above, by inserting the media items of the identified container, including the selected instance of the media item, rather than just the media item, a control device may reduce the steps involved in performing certain tasks.

In some implementations, a given playback device of a media playback system may maintain the queue. To insert the two or more media items of the identified container into such a queue, a control device may send, to the playback device, a command to insert the two or more media items of the identified container into the queue. Upon receiving such a command, the playback device may add the media items of the identified container to its queue. In some cases, multiple media playback devices may be involved in maintaining a queue. For instance, two or more playback devices may each maintain a copy of the queue, or perhaps, each might maintain a portion of the queue. In some cases, a media playback system may include multiple zones, and one or more playback devices of a zone may maintain a queue for that zone.

Alternatively, another computing system may maintain a queue, which may be accessible to the control device via a wide area network, such as the Internet. For instance, a cloud service provider may provide a cloud queue service. The cloud queue service may maintain or have access to one or more playback queues. In some instances, the cloud queue service may maintain playback queues for media playback systems registered with the cloud queue service. Such playback queues may be referred to as cloud queues. One or more computing systems may be used to provide the cloud queue service and to maintain the cloud queue(s) in data storage. To insert the two or more media items of the identified container into a cloud queue, a control device may send, to the computing system, a command to insert the two or more media items of the identified container into the cloud queue. Upon receiving such a command, the computing system may add the media items of the identified container to the cloud queue.

In some embodiments, a control device may insert the media items of a container into a queue such that the media items follow the sequence indicated by the container within the queue. As noted above, some containers, such as playlists or albums, may indicate a sequence for the media items within the container. The control device may maintain this sequence when inserting the media items into the queue. By inserting the media items of the container into the queue in this manner, playback of the queue may follow the expected playback sequence of the container when the media items of the container are played back from the queue.

In some examples, before inserting the two or more media items of the identified container into the queue, the control device may verify that such manipulation of the queue is intended. For instance, the control device may cause a graphical interface to display a selectable control that, when selected, causes the control device to insert the two or more media items of the identified container into the queue. By detecting input data indicating a selection of this selectable control, the operations are verified. By performing this verification, the control device may avoid surprising a user with unexpected behavior, among other possible benefits.

Within examples, the control device may insert the media items of the container into different locations within the queue. For instance, the control device may insert the media items before any other media items in the queue (i.e., at the beginning of the queue). Alternatively, the control device may insert the media items after other media items in the queue (i.e., at the end of the queue). As another example, the control device may insert the media items in the middle of the queue (e.g., after a media item that is currently playing, or was previously playing). Other examples are possible as well.

e. Initiate Playback of Queue

In FIG. 5, at block 510, method 500 involves initiating playback of the queue. For instance, a control device may cause one or more playback devices of a media playback system to initiate playback of the queue beginning with the given media item. In some cases, two or more playback devices may be joined into a zone. In such cases, the control device may cause the two or more playback devices of the zone to initiate playback of the queue in synchrony beginning with the given media item. Within examples, a control device may initiate playback on a given playback device by sending, via a network interface, a command to the playback device to initiate playback of the queue.

A control device may perform certain operations upon detecting the input data indicating a selection of a particular instance of a media item. For example, responsive to detecting input data indicating a selection of a particular instance of a given media item, the control device may (i) identifying a container of two or more media items (including the selected instance of the media item), (ii) insert the two or more media items into a queue, and (iii) initiate playback of the queue. From a user's perspective, such operations may appear to automatically queue the container of media items and initiate playback of a selected media item after that media item is selected, which may improve user experience.

By maintaining the sequencing of the container within the queue, transport controls associated with the queue may follow the sequencing of the container. For instance, when playing queued media items that are part of a container, a control device may respond to a "skip forward" or "skip back" input by skipping forward or skipping backward to the subsequent or previous media item as indicated by the container's sequence. To operate such transport controls on a queue maintained remotely from the control device (e.g., by a playback device), the control device may send, to the playback device, a command corresponding to a selected transport control (e.g., a command to skip forward within the queue to a subsequent media item). Upon receiving such a command, the playback device may carry out the command (e.g., by initiating playback of a media item that follows the given media item in the indicated sequence). Such functionality may improve the user experience, as some user may expect certain sequencing of the media items within a container.

In some embodiments, the control device may cause a graphical interface to display a control interface that indicates the queue (e.g., a queue that is maintained on playback device or in the cloud). For instance, referring back to FIG. 4, controller interface 400 includes a playback queue region 440, which may include an indication of media items that are in the queue, perhaps including the media items of the identified container.

IV. Example Techniques to Facilitate Queuing and Playback

As discussed above, embodiments described herein may facilitate certain tasks related to adding a container of media items to a queue and initiating playback of the queue. FIG. 5 illustrates another example method 800 to facilitate (i) queuing a container of a media items, and (ii) initiating playback of the queue beginning with a particular media item from within that container a. Receive Data Indicating a Particular Instance of a Media Item At block 802, method 800 involves receiving data indicating a particular instance of a given media item. For instance, a playback device of a media playback system (e.g., playback device 112 of media playback system 100) may receive, via a network interface, data indicating a particular instance of a given media item that was selected for playback). As noted above, a control device of the media playback system (e.g., control device 126 of media playback system 100) may display a control interface (e.g., control interface 600 of FIG. 6 or control interface 700 of FIG. 7). By way of such a control interface, a particular instance of a media item may be selected. The control device may send, to the playback device, data indicated the selected instance of the media item.

b. Identify a Container of Media Items

At block 804, method 800 involves identifying a container of media items. For example, a playback device may identify a container of two or more media items. The playback device may identify the container that includes the particular instance of the given media item (e.g., the playlist or album that includes the selected instance of the media item). The playback device may identify the container using any suitable technique, including, for example, the example techniques described above in connection with method 500.

c. Insert Media Items into a Queue

At block 806, method 800 involves inserting the media items into the queue. For instance, a playback device may insert the two or more media items of the identified container into a queue that is maintained by the playback device. Alternatively, playback device may insert the two or more media items of the identified container into a queue that is maintained by a cloud queue service.

Inserting the media items into the queue may involve a playback device receiving a message indicating the media items of the container, perhaps by way of a network interface. For instance, a control device may send a command to insert the media items of a particular container into the queue. Upon receiving such a message, the playback device may add the media items of the container into the queue.

In some cases, a playback device may indicate, to the control device, the status of the queue (e.g., which media items are presently queued). For instance, the playback device may send, to a control device data indicating the queue. The queue may include the two or more media items of the identified container. Upon receiving such data, the control device may display a control interface that indicates the media items of the queue (e.g., controller interface 400 of FIG. 4).

d. Initiate Playback of Queue

At block 808, method 800 involves initiating playback of the queue. For instance, a playback device may initiate playback of the queue beginning with the given media item. In some cases, two or more playback devices may be joined into a zone. In such cases, the playback device may cause the one or additional playback devices of the zone to initiate playback of the queue in synchrony beginning with the given media item.

V. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

As indicated above, example techniques may facilitate certain tasks related to queuing a container of a media items, and initiating playback of the queue beginning with a particular media item from within that container. In one aspect, a method is provided. The method may involve displaying a control interface that includes an indication of one or more playable media items, the one or more playable items including at least one instance of a given media item. The method may also involve detecting input data indicating a selection of a particular instance of the given media item from among the one or more playable media items. The method may involve identifying a container of two or more media items, the container including the particular instance of the given media item and indicating a sequence for the two or more media items. The method may further involve inserting the two or more media items of the identified container into a queue such that the two or more media items follow the indicated sequence within the queue and causing one or more playback devices of a media playback system to initiate playback of the queue beginning with the given media item.

In another aspect, a device is provided. The device includes a network interface, at least one processor, a data storage, and program logic stored in the data storage and executable by the at least one processor to perform functions. The functions may include displaying a control interface that includes an indication of one or more playable media items, the one or more playable items including at least one instance of a given media item. The functions may also include detecting input data indicating a selection of a particular instance of the given media item from among the one or more playable media items. The functions may include identifying a container of two or more media items, the container including the particular instance of the given media item and indicating a sequence for the two or more media items. The functions may further include inserting the two or more media items of the identified container into a queue such that the two or more media items follow the indicated sequence within the queue and causing one or more playback devices of a media playback system to initiate playback of the queue beginning with the given media item.

In yet another aspect, a non-transitory computer readable memory is provided. The non-transitory computer readable memory has stored thereon instructions executable by a computing device to cause the computing device to perform functions. The functions may include displaying a control interface that includes an indication of one or more playable media items, the one or more playable items including at least one instance of a given media item. The functions may also include detecting input data indicating a selection of a particular instance of the given media item from among the one or more playable media items. The functions may include identifying a container of two or more media items, the container including the particular instance of the given media item and indicating a sequence for the two or more media items. The functions may further include inserting the two or more media items of the identified container into a queue such that the two or more media items follow the indicated sequence within the queue and causing one or more playback devices of a media playback system to initiate playback of the queue beginning with the given media item.

In yet another aspect, another method is provided. The method may involve receiving, via the network interface, data indicating a particular instance of a given media item that was selected for playback. The method may also involve identifying a container of two or more media items, the container including the particular instance of the given media item that was selected for playback and indicating a sequence for the two or more media items. The method may further involve inserting the two or more media items of the identified container into a queue of the playback device such that the two or more media items follow the indicated sequence within the queue and initiating play back of the queue beginning with the given media item.

In another aspect, a device is provided. The device includes a network interface, at least one processor, a data storage, and program logic stored in the data storage and executable by the at least one processor to perform functions. The functions may include receiving, via the network interface, data indicating a particular instance of a given media item that was selected for playback. The functions may also include identifying a container of two or more media items, the container including the particular instance of the given media item that was selected for playback and indicating a sequence for the two or more media items. The functions may further include inserting the two or more media items of the identified container into a queue of the playback device such that the two or more media items follow the indicated sequence within the queue and initiating play back of the queue beginning with the given media item.

In yet another aspect, a non-transitory computer readable memory is provided. The non-transitory computer readable memory has stored thereon instructions executable by a computing device to cause the computing device to perform functions. The functions may include receiving, via the network interface, data indicating a particular instance of a given media item that was selected for playback. The functions may also include identifying a container of two or more media items, the container including the particular instance of the given media item that was selected for playback and indicating a sequence for the two or more media items. The functions may further include inserting the two or more media items of the identified container into a queue of the playback device such that the two or more media items follow the indicated sequence within the queue and initiating play back of the queue beginning with the given media item.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

We claim:

1. A tangible, non-transitory computer readable medium having stored therein instructions executable by one or more processors to cause a control device to perform functions comprising:

receiving, via a control interface that is displayed on a graphical display, input data representing a search query to a search control;

after performing a search corresponding to the search query, displaying, via the control interface, a list of search results to the search query the search results including multiple audio tracks that each represent the same particular song, wherein two or more audio tracks of the search results are members of respective pre-defined containers defining, prior to the search, (i) a set of audio tracks and (ii) a sequence to play back the set of audio tracks, and wherein each pre-defined container is one of (a) an album defining the set of audio tracks at release of the album or (b) a playlist defining the set of audio tracks after their respective releases;

in response to receiving, via the control interface, input data indicating a selection of a given audio track representing the particular song from among the search results: (i) identifying the selected audio track as a member of a particular pre-defined container defining (a) a particular set of audio tracks and (b) a particular playback sequence to play back the set of audio tracks and (ii) displaying, via the graphical display, a selectable control that, when selected, causes the control device to insert the particular pre-defined set of audio tracks defined by the particular pre-defined container into a queue on a playback device; and in response to receiving input data indicating a selection of the selectable control that, when selected, causes the control device to insert the particular pre-defined container into the queue on the playback device: (i) causing, via a network interface over one or more networks, the playback device to insert the particular pre-defined set of audio tracks defined by the particular pre-defined container according to the particular playback sequence defined by the particular pre-defined container and (ii)

causing, via the network interface over the one or more networks, the playback device to immediately initiate playback of the queue beginning with the selected audio track.

2. The tangible, non-transitory computer readable medium of claim 1, wherein identifying the selected audio track as a member of the particular pre-defined container comprises:
  determining that the selected audio track representing the particular song is a member of a particular pre-defined playlist that defines a first set of audio tracks having a first playback sequence, wherein the selected audio track is also a member of an album that defines a second set of audio tracks having a second playback sequence; and
  identifying, as the particular pre-defined container, the playlist that defines the first set of audio tracks having the first playback sequence.

3. The tangible, non-transitory computer readable medium of claim 1, wherein displaying the list of search results to the search query comprises:
  displaying, within the list, an indication of a first audio track representing the particular song and an indication that the first audio track is a member of a first pre-defined playlist that defines a first set of audio tracks having a first playback sequence, wherein the first audio track is also a member of a first album; and
  displaying, within the list, an indication of a second audio track representing the particular song and an indication that the second audio track is a member of a second pre-defined playlist that defines a second set of audio tracks having a second playback sequence, wherein the second audio track is also a member of (a) the first album or (b) a second album; and
  wherein identifying the selected audio track as a member of the particular pre-defined container comprises:
  determining that the input data indicates that the second audio track was selected; and
  identifying the second pre-defined playlist as the particular pre-defined container based on determining that the input data indicates that the second audio track was selected.

4. The tangible, non-transitory computer readable medium of claim 1, wherein displaying the list of search results to the search query comprises:
  displaying, within the list, an indication of a first audio track representing the particular song, an indication that the first audio track is part of a given album, the given album defining a first set of audio track having a given playback sequence and an indication that the given album is accessible from a first streaming audio service, wherein the playback device access the first set of audio tracks of the given album from one or more first servers of the first streaming audio service; and
  displaying, within the list, an indication of a second audio track representing the particular song, an indication that the second audio track is part of the given album, and an indication that the given album is available from a second streaming audio service, wherein the first audio track and the second audio track are respective instances of the same audio track, and
  wherein identifying the selected audio track as a member of the particular pre-defined container comprises:
  determining that the input data indicates that the second audio track was selected; and
  identifying, as the particular pre-defined container, the given album from the second streaming audio service.

5. The tangible, non-transitory computer readable medium of claim 1, wherein the particular playback sequence defined by the particular pre-defined container orders the selected audio track representing the particular song after another audio track in the particular pre-defined container.

6. The tangible, non-transitory computer readable medium of claim 1, wherein performing the search comprises:
  sending, via the network interface to respective servers of two or more streaming audio services, a request for search results corresponding to the search query; and
  receiving, via the network interface from at least one server of a given streaming audio service, data representing search results corresponding to the search query from the given streaming audio service.

7. The tangible, non-transitory computer readable medium of claim 1, wherein, after receiving the input data indicating the selection of the given audio track representing the particular song from among the search results, the control device performs, independently of any additional user input, the function of displaying the selectable control that, when selected, causes the control device to insert the particular pre-defined container into a queue on a playback device.

8. The tangible, non-transitory computer readable medium of claim 1, wherein, after receiving the input data indicating the selection of the selectable control that, when selected, causes the control device to insert two or more audio tracks of the identified container into the queue on the playback device, the control device performs, independently of any additional user input, the functions of (i) causing the playback device to insert the particular pre-defined set of audio tracks defined by the particular pre-defined container according to the particular playback sequence defined by the particular container into the queue and (ii) causing the playback device to immediately initiate playback of the queue beginning with the selected audio track.

9. A method comprising:
  receiving, by a control device via a control interface that is displayed on a graphical display, input data representing a search query to a search control;
  after performing a search corresponding to the search query, causing, by the control device via the control interface, the graphical display to display a list of search results to the search query the search results including multiple audio tracks that each represent the same particular song, wherein two or more audio tracks of the search results are members of respective pre-defined containers defining, prior to the search, (i) a set of audio tracks and (ii) a sequence to play back the set of audio tracks, and wherein each pre-defined container is one of (a) an album defining the set of audio tracks at release of the album or (b) a playlist defining the set of audio tracks after their respective releases;
  in response to receiving, by the control device via the control interface, input data indicating a selection of a given audio track representing the particular song from among the search results: (i) identifying, via the control device, the selected audio track as a member of a particular pre-defined container defining (a) a particular set of audio tracks and (b) a particular playback sequence to play back the set of audio tracks and (ii) causing, by the control device, the graphical display to display a selectable control that, when selected, causes the control device to insert the particular pre-defined set of audio tracks defined by the particular pre-defined container into a queue on a playback device; and in response to receiving input data indicating a selection of the selectable control that, when selected, causes the control device to insert the particular pre-defined container into the queue on the playback device: (i) causing, by the control device via a network interface over one or more networks, the playback device to insert the particular pre-defined set of audio tracks defined by the particular pre-defined container according to the particular playback sequence defined by the particular pre-defined container and (ii) causing, by the control device via the network interface over the one or more networks, the playback device to immediately initiate playback of the queue beginning with the selected audio track.

10. The method of claim 9, wherein identifying the container consisting of the pre-defined set of two or more audio tracks comprises:
    determining that the selected audio track representing the particular song is a member of a particular pre-defined playlist that defines a first set of audio tracks having a first playback sequence, wherein the selected audio track is also a member of an album that defines a second set of audio tracks having a second playback sequence; and
    identifying, as the particular pre-defined container, the playlist that defines the first set of audio tracks having the first playback sequence.

11. The method of claim 9, wherein displaying the list of search results to the search query comprises:
    displaying, within the list, an indication of a first audio track representing the particular song and an indication that the first audio track is a member of a first pre-defined playlist that defines a first set of audio tracks having a first playback sequence, wherein the first audio track is also a member of a first album; and
    displaying, within the list, an indication of a second audio track representing the particular song and an indication that the second audio track is a member of a second pre-defined playlist that defines a second set of audio tracks having a second playback sequence, wherein the second audio track is also a member of (a) the first album or (b) a second album; and
    wherein identifying the selected audio track as a member of the particular pre-defined container comprises:
    determining that the input data indicates that the second audio track was selected; and
    identifying the second pre-defined playlist as the particular pre-defined container based on determining that the input data indicates that the second audio track was selected.

12. The method of claim 9, wherein displaying the list of search results to the search query comprises:
    displaying, within the list, an indication of a first audio track representing the particular song, an indication that the first audio track is part of a given album, the given album defining a first set of audio track having a given playback sequence and an indication that the given album is accessible from a first streaming audio service, wherein the playback device access the first set of audio tracks of the given album from one or more first servers of the first streaming audio service; and
    displaying, within the list, an indication of a second audio track representing the particular song, an indication that the second audio track is part of the given album, and an indication that the given album is available from a second streaming audio service, wherein the first audio track and the second audio track are respective instances of the same audio track, and
    wherein identifying the selected audio track as a member of the particular pre-defined container comprises:
    determining that the input data indicates that the second audio track was selected; and
    identifying, as the particular pre-defined container, the given album from the second streaming audio service.

13. The method of claim 9, wherein, after receiving the input data indicating the selection of the given audio track representing the particular song from among the search results, the control device performs, independently of any additional user input, the function of displaying the selectable control that, when selected, causes the control device to insert the particular pre-defined container into a queue on a playback device.

14. The method of claim 9, wherein, after receiving the input data indicating the selection of the selectable control that, when selected, causes the control device to insert two or more audio tracks of the identified container into the queue on the playback device, the control device performs, independently of any additional user input, the functions of (i) causing the playback device to insert the particular pre-defined set of audio tracks defined by the particular pre-defined container according to the particular playback sequence defined by the particular container into the queue and (ii) causing the playback device to immediately initiate playback of the queue beginning with the selected audio track.

15. The method of claim 9, wherein performing the search comprises:
    sending, via the network interface to respective servers of two or more streaming audio services, a request for search results corresponding to the search query; and
    receiving, via the network interface from at least one server of a given streaming audio service, data representing search results corresponding to the search query from the given streaming audio service.

16. A control device comprising:
    a network interface;
    a graphical display;
    at least one processor;
    a data storage; and
    a program logic stored in the data storage and executable by the at least one processor to perform functions comprising:
    receiving, via a control interface that is displayed on the graphical display, input data representing a search query to a search control;
    after performing a search corresponding to the search query, displaying, via the graphical display, a list of search results to the search query the search results including multiple audio tracks that each represent the same particular song, wherein two or more audio tracks of the search results are members of respective pre-defined containers defining, prior to the search, (i) a set of audio tracks and (ii) a sequence to play back the set of audio tracks, and wherein each pre-defined container is one of (a) an album defining the set of audio tracks at release of the album or (b) a playlist defining the set of audio tracks after their respective releases;
    in response to receiving, via the control interface, input data indicating a selection of a given audio track representing the particular song from among the search results: (i) identifying the selected audio track as a member of a particular pre-defined container defining (a) a particular set of audio tracks and (b) a particular playback sequence to play back the set of audio tracks and (ii) displaying, via the graphical display, a selectable control that, when selected, causes the control device to insert the particular pre-defined set of audio tracks defined by the particular pre-defined container into a queue on a playback device; and in response to receiving input data indicating a selection of the selectable control that, when selected, causes the control device to insert the particular pre-defined container into the queue on the playback device: (i) causing, via a network interface over one or more networks, the playback device to insert the particular pre-defined set of audio tracks defined by the particular pre-defined container according to the particular playback sequence defined by the particular pre-defined container and (ii) causing, via the network interface over the one or more networks, the playback device to immediately initiate playback of the queue beginning with the selected audio track.

17. The control device of claim 16, wherein, after receiving the input data indicating the selection of the given audio track representing the particular song from among the search results, the control device performs, independently of any additional user input, the function of displaying the selectable control that, when selected, causes the control device to insert the particular pre-defined container into a queue on a playback device.

18. The control device of claim 16, wherein, after receiving the input data indicating the selection of the selectable control that, when selected, causes the control device to insert two or more audio tracks of the identified container into the queue on the playback device, the control device performs, independently of any additional user input, the functions of (i) causing the playback device to insert the particular pre-defined set of audio tracks defined by the particular pre-defined container according to the particular playback sequence defined by the particular container into the queue and (ii) causing the playback device to immediately initiate playback of the queue beginning The with the selected audio track.

19. control device of claim 16, wherein the particular playback sequence defined by the particular pre-defined container orders the selected audio track representing the particular song after another audio track in the particular pre-defined container.

20. The control device of claim 16, wherein performing the search comprises:

sending, via the network interface to respective servers of two or more streaming audio services, a request for search results corresponding to the search query; and receiving, via the network interface from at least one server of a given streaming audio service, data representing search results corresponding to the search query from the given streaming audio service.

* * * * *